J. BURDA.
GLASS CUTTING DEVICE.
APPLICATION FILED MAR. 2, 1918.
1,282,375.
Patented Oct. 22, 1918.
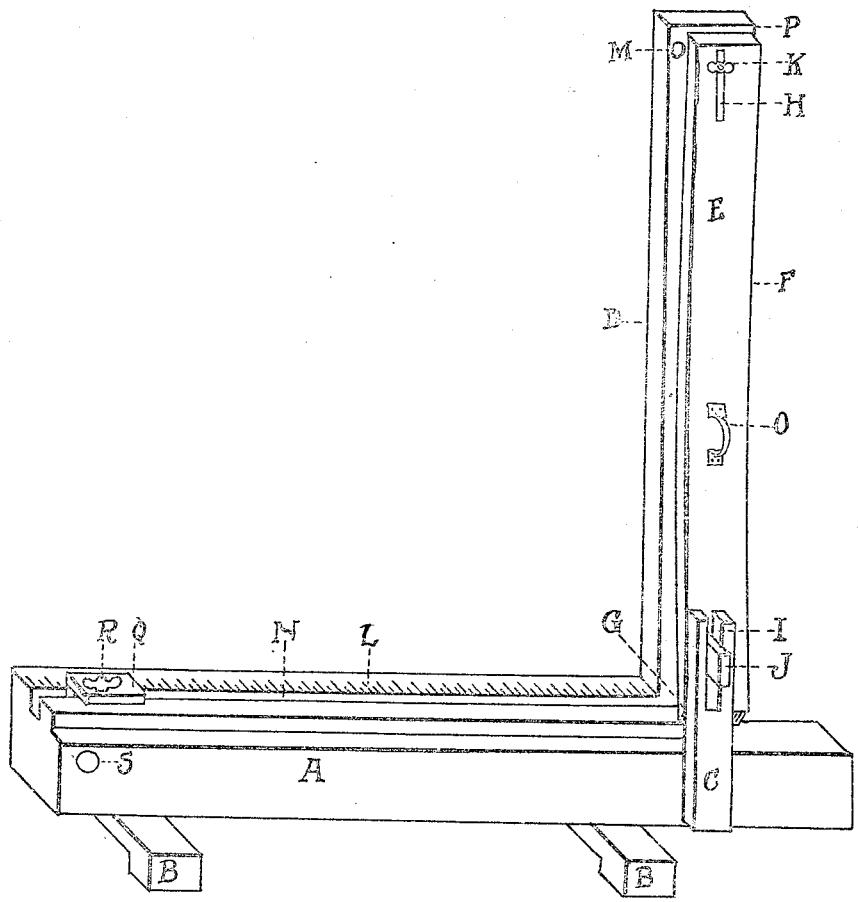
Witnesses
Frank J. Burda
George A. Nowecki
Inventor.
Joseph Burda.

UNITED STATES PATENT OFFICE.

JOSEPH BURDA, OF CHICAGO, ILLINOIS.

GLASS-CUTTING DEVICE.

1,282,375. Specification of Letters Patent. Patented Oct. 22, 1918.

Application filed March 2, 1918. Serial No. 220,090.

*To all whom it may concern:*

Be it known that I, JOSEPH BURDA, a citizen of the United States, residing at Chicago, in the county of Cook and State of Illinois, have invented a new and useful Glass-Cutting Device, of which the following is a specification.

My invention relates to improvements in glass-cutting devices in which sheet glass may be cut standing on edge, in an upright position; and the objects of my invention are, first, to provide a glass cutting device which will reduce the danger of mismeasurements, and breakage of glass in glass-cutting to a minimum; second, to make the use of special tables, and other cumbersome apparatus for glass-cutting unnecessary; and, third, to provide a glass-cutting device which will take up very little space, may be used standing on the floor or bench, or, may be hung up on the wall or against shelving, so as to be out of the way, and still, be always ready for use. I attain these objects by the device illustrated in the accompanying drawing, which is a perspective view of the entire device.

The grooved block A, its legs B B, and the slotted guide-member C, constitute the base of the device: The upright D, its lower end fixed into block A, is the backing against which glass to be cut is pressed by means of straight-edge E; the straight-edge E, is used, first, to hold the pane of glass to be cut, in the glass-cutting device; second, to press glass against upright D; third, to guide the glass-cutting tool, along its outside edge F. The bottom end G, of straight-edge E, is beveled to permit same to enter groove N, in base A, and to exert pressure against the glass to be cut.

When not in use, the straight-edge E, rests on top of base A, a short distance from upright D, permitting the insertion of a pane of glass into groove N, in base A, and between upright D, and straight-edge E; to use straight-edge E, it is raised off the base, by lifting on handle O, then it is pushed toward upright D, and dropped into groove N. When using the device, the operator holds upright D, and straight-edge E, together, with one hand, immediately above the pane of glass to be cut, so applying a uniform pressure to the entire working length of the straight-edge E, which is slightly curved, to facilitate the even distribution of pressure, while using the glass cutting tool with the other hand. The edge F, of the straight-edge E, is the guide for the glass-cutting tool. After cutting the glass, that portion of it outside of the cutting device is broken off by bending same over the outside edge P, of the upright D. The bolt K, set into upright D, near its top and protruding through slot H, in straight-edge E, and lug J, fixed into straight-edge E, near its bottom end, and working in slot I, in guide member C, permit straight-edge E, to be moved upward, downward, forward, toward upright D, and back against guide-member C, always keeping edge F, of the straight-edge E, parallel to and directly over edge P, of upright D, the graduated rule L, is disposed to show and measure the distance from edge F, of the straight-edge E, to any point along groove N, in base A. The stop Q, may be set at any point in groove N, and may be locked by turning set-screw R. It is used when several lights of glass are to be cut exactly the same size.

The hole M, in upper part of upright D, and hole S, in base A, are means for hanging up the glass-cutting device on spikes or bolts provided for that purpose, when the device is to be used in a hanging position.

I am not aware that prior to my invention glass-cutting devices have been made in which sheet glass could be cut standing on edge, in an upright position, and therefore,

I claim:

1. In a glass cutting device, a horizontal base member provided with a scale, a straight-edged backing extending vertically from said base, a straight-edge slidably connected to said backing to move along and toward and from said backing, and a stop adjustable along the scale on said base member.

2. In a glass cutting device, a horizontal base member provided with a groove and a scale extending along said groove, a straight-edged backing extending vertically from said base member and having one face flush with one side of said groove, a stop adjustable along said groove, means for holding the stop in adjusted position, a straight-edge having one end beveled to enter said groove, means sliably connecting said straight-edge to the backing member, and means for moving the straight-edge along and toward and from said backing member.

JOSEPH BURDA.

Copies of this patent may be obtained for five cents each, by addressing the "Commissioner of Patents, Washington, D. C."